United States Patent
Graf

(10) Patent No.: US 7,954,601 B2
(45) Date of Patent: Jun. 7, 2011

(54) LUBRICANT DISPENSER

(75) Inventor: Walter Graf, Euerdorf (DE)

(73) Assignee: perma-tec GmbH & Co. KG, Euerdorf (DE)

( * ) Notice: Subject to any disclaimer, the term of this patent is extended or adjusted under 35 U.S.C. 154(b) by 1191 days.

(21) Appl. No.: 11/325,951

(22) Filed: Jan. 5, 2006

(65) Prior Publication Data

US 2006/0180395 A1  Aug. 17, 2006

(30) Foreign Application Priority Data

Feb. 1, 2005  (DE) .......................... 10 2005 004 456

(51) Int. Cl.
*B67D 7/60* (2010.01)
*F16N 5/00* (2006.01)

(52) U.S. Cl. .............................. 184/39; 184/92; 222/389

(58) Field of Classification Search .................... 184/5.1, 184/7.4, 92, 93, 39, 88.1, 26; 222/389, 401, 222/402, 387, 326, 327

See application file for complete search history.

(56) References Cited

U.S. PATENT DOCUMENTS

| | | | | |
|---|---|---|---|---|
| 4,023,648 A * | 5/1977 | Orlitzky et al. | ................ | 184/39 |
| 4,671,386 A * | 6/1987 | Orlitzky | ...................... | 184/39 |
| 4,744,442 A * | 5/1988 | Bras et al. | .................... | 184/39 |
| 5,012,897 A * | 5/1991 | Jorissen | ......................... | 184/39 |
| 5,386,883 A * | 2/1995 | Graf | ................................. | 184/39 |
| 5,404,966 A | 4/1995 | Yang | | |
| 5,409,084 A * | 4/1995 | Graf | ................................. | 184/39 |
| 5,460,242 A * | 10/1995 | Graf | ................................. | 184/29 |
| 5,460,243 A * | 10/1995 | Patterson | ....................... | 184/29 |
| 5,547,043 A * | 8/1996 | Graf et al. | ...................... | 184/39 |
| 5,598,901 A * | 2/1997 | Graf | ................................. | 184/39 |
| 6,180,901 B1 * | 1/2001 | Bauer et al. | .................. | 200/277 |
| 6,299,743 B1 * | 10/2001 | Oloman et al. | .............. | 204/252 |
| 6,786,365 B2 * | 9/2004 | Kim | ................................ | 222/389 |
| 6,964,356 B2 * | 11/2005 | Kim | ................................ | 222/389 |
| 2002/0146622 A1 * | 10/2002 | Richter et al. | ............... | 429/204 |
| 2008/0060879 A1 * | 3/2008 | Orlitzky et al. | ................. | 184/39 |
| 2009/0038888 A1 * | 2/2009 | Eisenbacher | ................... | 184/39 |

FOREIGN PATENT DOCUMENTS

DE  43 30 793  6/1994

* cited by examiner

*Primary Examiner* — Bradley T King
*Assistant Examiner* — Thomas Irvin
(74) *Attorney, Agent, or Firm* — Collard & Roe, P.C.

(57) ABSTRACT

A lubricant dispenser includes a lubricant container that has an outlet opening for lubricant, a piston disposed in the lubricant container, and a cap connected with the lubricant container, having a device for generating a gas that impacts the piston. The device for gas generation has a gas cell with an electrolyte fluid and electrodes for electrochemical gas generation, a power source, as well as an electrical connection between the power source and the electrodes with a switch. The cap is a plastic injection-molded part produced in one piece, formed from several parts, using the multi-component injection-molding method, which part is made of an outer ring made of insulation material and an insert that forms the gas cell, having two electrically conductive wall regions as electrodes, as well as having an intermediate piece that separates the conductive regions. The insert contains a sponge saturated with electrolyte fluid, and is closed off with a plastic lid.

13 Claims, 2 Drawing Sheets

# LUBRICANT DISPENSER

CROSS REFERENCE TO RELATED APPLICATIONS

Applicant claims priority under 35 U.S.C. §119 of German Application No. 10 2005 004 456.5 filed on Feb. 1, 2005.

BACKGROUND OF THE INVENTION

1. Field of the Invention

The present invention relates to a lubricant dispenser. The dispenser has a lubricant container that has an outlet opening for lubricant, a piston disposed in the lubricant container, and a cap connected with the lubricant container. The cap has a device for generating a gas that impacts the piston. The device for gas generation has a gas cell with an electrolyte fluid and electrodes for electrochemical gas generation, a power source, as well as an electrical connection between the power source and the electrodes with a switch. When current flows, a gas is generated electrochemically, by means of which a pressure builds up on the back side of the piston. The pressure build-up results in an advance of the piston, by means of which lubricant is displaced out of the lubricant container. The gas development and therefore the dispensing rate of the lubricant can be controlled by changing the power flow. The gas development can be adjusted in such a manner that the lubricant is displaced out of the lubricant container over a defined period of time of several weeks or months, by means of a slow advance of the piston.

2. The Prior Art

A lubricant dispenser having the characteristics described is known from DE-A 43 30 793. The gas cell of the known lubricant dispenser consists of a storage medium saturated with electrolyte fluid, which is braced between two flat, metallic electrodes. Excess electrolyte fluid drips out of the storage medium into the piston and collects in a bowl-shaped depression on the back side of the piston, as residue. The residue that collects here does not participate in the electrochemical reaction. The electrolyte fluid, e.g. an aqueous sodium azide solution, is a substance that is harmful to the environment and hazardous to health. As a result, complicated protective measures are required during production of the gas cell and the saturation of the storage medium. Last but not least, the production of the gas cell is complicated also in that the electrodes, which are formed as metal parts, must be assembled in the cap with metallic contact elements and connected via rivets. This production requires a multiplicity of assembly steps. Automated assembly equipment must be used for series production, which has several workstations for feeding and positioning the metallic parts and for connecting the metallic parts.

SUMMARY OF THE INVENTION

It is an object of the present invention to provide a lubricant dispenser that is composed of few parts and thereby is easy to assemble. In this connection, the gas cell should be configured so that no electrolyte fluid exits from the gas cell during the production and assembly of the gas cell or during its subsequent use.

These and other objects are accomplished according to the invention by providing a lubricant dispenser having the characteristics described initially in which the cap is a plastic injection-molded part. The plastic injection-molded part, formed from several parts or components, is produced in one piece using the multi-component injection-molding method. The part is made up of an outer ring made of insulation material and an insert that forms the gas cell, having two electrically conductive wall regions as electrodes, as well as having an intermediate piece that separates the conductive regions. The insert contains a sponge saturated with electrolyte fluid, and is closed off with a plastic lid.

Preferably, the parts of the plastic injection-molded part have connection regions that engage into one another with a positive lock. The plastic parts are nested in one another by means of their positive lock configuration, and are rigidly connected with one another by means of the multi-component injection-molding method. Chemical cross-linking of the plastics in the claimed regions also contributes to the rigid connection. The cap completely and reliably seals the electric part of the lubricant dispenser off from the gas and lubricant chamber, without any elastomer seals. Even in the case of extended operation of the lubricant dispenser, no pressure can build up in the region of the battery and the electrical parts. The sponge saturated with an electrolyte fluid is encapsulated in a chamber of the insert that is closed off by means of the lid. A gas outlet opening that is small in cross-section is sufficient for gas exit from this chamber. This opening is provided in the lid or at the circumference of the insert. A gas outlet opening at the circumference of the insert is preferred.

During assembly of the gas cell, the sponge is placed into a depression of the insert. Subsequently, the electrolyte fluid is filled in and closed off with the plastic lid. As soon as the sponge comes into contact with the electrolyte fluid, the sponge swells up and absorbs the electrolyte fluid that is placed into the depression. The volume of the sponge saturated with electrolyte fluid can be many times the volume of the dry sponge. The sponge and the volume of the gas cell are coordinated with one another so that the sponge saturated with electrolyte fluid rests against the walls of the insert as well as against the lid, and completely fills the gas cell volume. Good contact with the electrically conductive surfaces of the insert is produced by means of the volume increase of the sponge by means of fluid wetting.

According to a preferred embodiment, the insert has a mantle and a base made of electrically conductive plastic as electrodes. The insert also has an intermediate piece of insulation plastic that separates the conductive regions. It is practical if the ring-shaped intermediate piece and the electrically conductive base form a bowl on the outside of the gas cell, to accommodate a button battery. The conductive plastic base can furthermore have projections on the outside that are molded on, to produce an electrical contact with the button battery. In a further advantageous embodiment, at least one projection is molded onto the electrically conductive base. The projection projects into the interior of the gas cell and is in contact with the saturated sponge.

The lid is connected with the insert in positive-lock manner, e.g. by means of a catch connection, and/or with a material bond, e.g. by means of gluing or bonding. Although less preferred, a screw connection may also be used. Preferably, the lid is domed concave to the outside. Any excess electrolyte fluid is collected in the dome of the lid.

The switch of the lubricant dispenser is preferably configured as a rotary switch and disposed in the face-side opening of the outer ring. Electrical connections for the power source and the gas cell are disposed at the rotary switch. In particular, a conductor track can be disposed on the inside of the rotary switch. The conductor track forms an electrical connection between the power source and the gas cell, with a resistance that is dependent on the angle of rotation of the switch. The contact between the rotary switch and the power source can be produced in simple manner, by means of an elastically resilient metallic insert part.

It is practical if the rotary switch is held in the outer ring of the cap so as to move in rotation, by means of a snap connection. To adjust the gas generation rate, the switch can be rotated as desired in both directions. Rotation can occur without the spring bias of the metallic spring element that is disposed between power source and rotary switch changing. In this manner, a uniform bias of the parts that are in electrical contact and reliable contacting are made possible.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
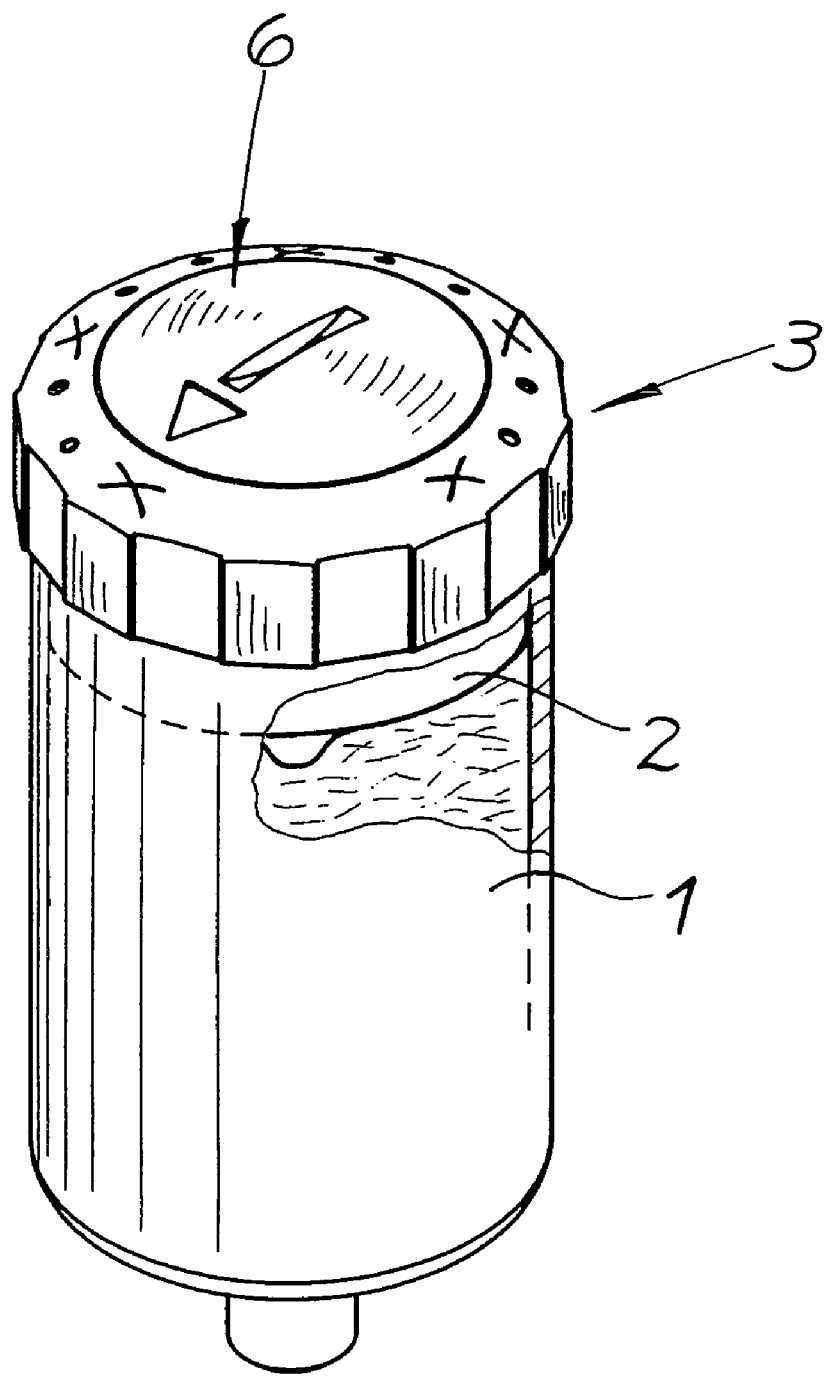
FIG. 1 is a perspective representation of a lubricant dispenser, partially broken open.

The fundamental structure of the lubricant dispenser shown in the drawings includes a lubricant container 1 that has an outlet opening for lubricant, a piston 2 disposed on the lubricant container 1, and a cap 3 connected with the lubricant container, having a device for generating a gas that impacts the piston. The device for gas generation has a gas cell 4 with an electrolyte fluid and electrodes for electrochemical gas generation, a power source 5 in the form of a button battery, as well as an electrical connection between the power source and the electrodes with a switch 6.

Figure 2:
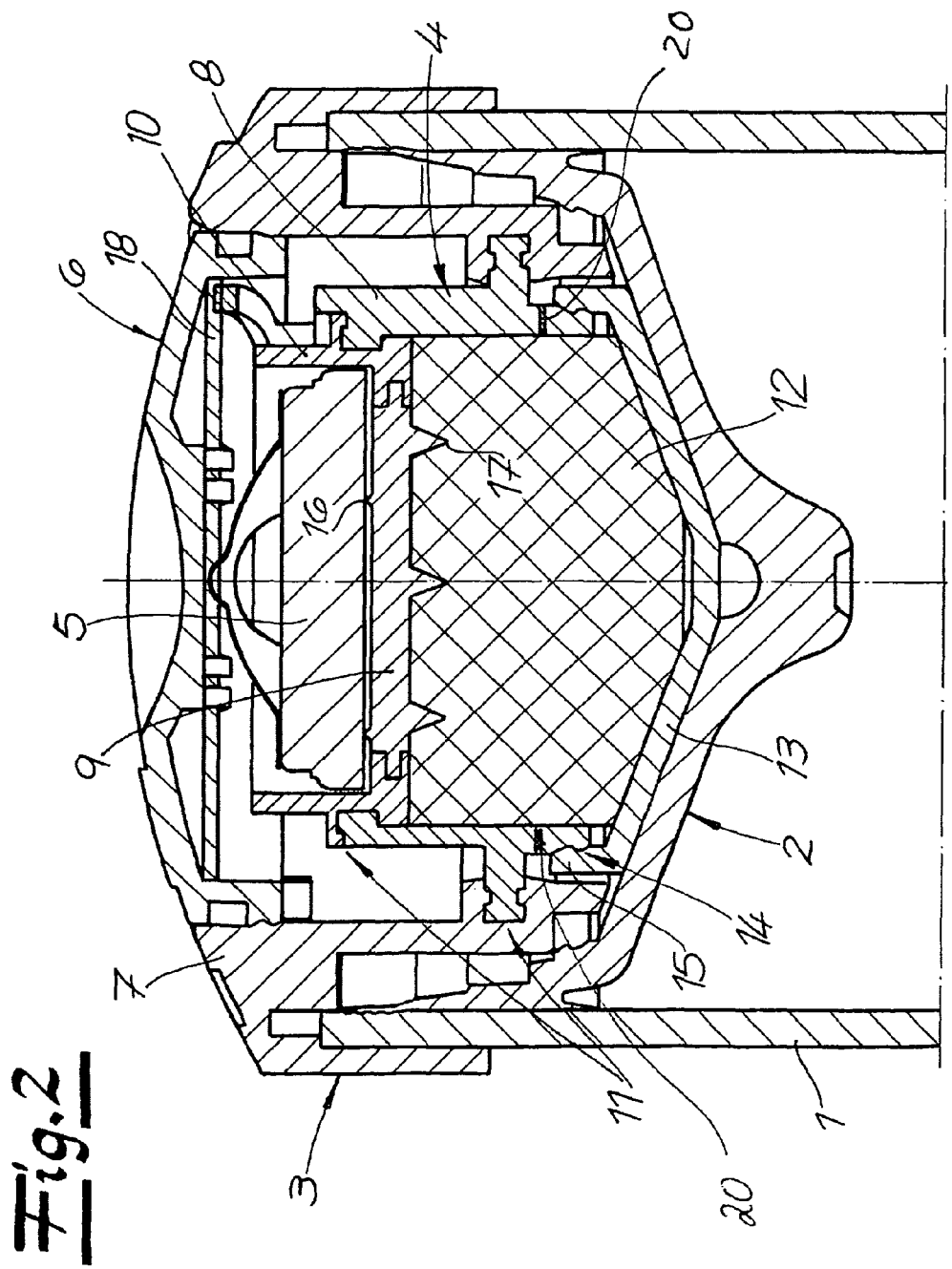
FIG. 2 is a longitudinal section through the head-side drive of the lubricant dispenser shown in FIG. 1.

As particularly evident from FIG. 2, cap 3 is a plastic injection-molded part produced in one piece, formed from several parts, using the multi-component injection-molding method. This part is made up of an outer ring 7 made of insulation material and an insert that forms gas cell 4, having two electrically conductive wall regions 8, 9 electrodes, as well as having an intermediate piece 10 that separates the conductive regions. The electrically conductive wall regions 8, 9 are made up of a plastic that has sufficient electrical conductivity by means of fillers, particularly graphite. The current flow for gas generation is slight, and lies in the range between 5 and 400 μA. The parts of the plastic injection-molded part have connection regions 11 that engage into one another with a positive lock. Connection regions 11 are rigidly connected with one another both by means of the positive lock and by means of chemical cross-linking of the plastics to form a one-piece molded body. Cap 3, which is configured as a plastic injection-molded part, contains no bores or other passage openings, and reliably seals the upper electrical part of the gas drive off from the gas generation chamber.

The insert contains a sponge 12 saturated with electrolyte fluid, and is closed off with a plastic lid 13. The lid can be produced from an inexpensive plastic material 13 and is connected with the insert with a positive lock, in the exemplary embodiment, by means of a catch connection 14. Other means of connection, such as gluing, bonding, a screw connection, or similar connection means also may be used. Lid 13 is domed in concave shape towards the outside.

At the circumference of the insert, a gas exit opening 20 for the gas that forms electrochemically is provided. The gas exit opening 20 can be made up of one or several bores that are disposed on the circumference of the insert or in the lid. In the exemplary embodiment and according to a preferred embodiment, catch connection 14 between the insert and the lid is not structured to be gas-tight. A narrow gap remains in the connection region, through which the gas that is generated can exit at the circumference, in a uniform distribution. The arrangement is permeable for gas, but almost completely sealed for fluids, so that good protection against the toxic electrolyte fluid is guaranteed. Lid 13 has a collar 15 that surrounds the insert on the outside. By means of this arrangement, the gas outlet gap is not in direct contact with the fluid-saturated sponge 12 in the connection region between the parts, and is not wetted with a fluid film. Consequently, no capillary fluid can penetrate to the outside through the gap.

As evident from. FIG. 2, the electrically conductive wall regions 8, 9 are configured as mantle and base surfaces. The insert has a mantle 8 as well as a base 9 made of electrically conductive plastic as electrodes. The insert also has a ring-shaped intermediate piece 10 that separates the conductive regions. Ring-shaped intermediate piece 10 and electrically conductive base 9 form a bowl on the outside of the gas cell. The bowl formed accommodates power source 5 which is configured as a button battery. This is because the base directly supports the button battery. Conductive plastic base 9 has projections 16 molded onto the outside, for producing an electrical contact with button battery 5. Furthermore, projections 17 are molded onto electrically conductive base 9, which project into the interior of gas cell 4 and are in contact with saturated sponge 12. Projections 17, which project into sponge 12, are configured as blades or tips. Projections 17 not only serve as contacting elements, but also facilitate assembly of sponge 12 and handling during production.

Switch 6 for turning on the gas generation device and for setting the gas generation rate is configured as a rotary switch and disposed in the face-side opening of outer ring 7. Switch 6 has electrical connectors for power source 5 and gas cell 4. A conductor track is disposed on the inside of the rotary switch. The conductor track forms an electrical connection between the power source and the gas cell, with a resistance dependent on the angle of rotation of the switch. In the exemplary embodiment, the conductor track is disposed on a board 18 that is attached to the inside of switch 6. Board 18 can be fitted with electrical circuits and usual electronic elements.

Rotary switch 6 is held in outer ring 7 of the cap so as to move in rotation, by means of a snap connection.

Although at least one embodiment has been shown and described, it is to be understood that many changes and modifications may be made thereunto without departing from the spirit and scope of the invention as defined in the appended claims.

What is claimed is:

1. A lubricant dispenser comprising:
   (a) a lubricant container having an outlet opening for a lubricant;
   (b) a piston disposed in said lubricant container;
   (c) a cap connected with said lubricant container consisting of a plastic injection-molded part being one piece and comprising an outer ring made of an electrically insulating material, an insert having two electrically conductive walls as electrodes for electro-chemical gas generation and an intermediate piece separating conductive regions of said walls, wherein the insert contains a sponge saturated with electrolyte fluid and is closed with a lid;
(d) a power source;
(e) an electrical connection between the power source and the electrodes of the cap comprising a switch; and
(f) wherein said electrically conductive walls comprise a mantle and a base made of an electrically conductive plastic, and said intermediate piece comprises an insulating plastic;
wherein the intermediate piece is ring-shaped, and said intermediate piece and said base form a bowl on an outside portion of the gas cell for receipt of a button battery, and the base directly supports the button battery;
wherein said base has a plurality of exterior molded projections for producing an electrical contact with the button battery; and
wherein at least one projection is molded onto said base, said at least one projection projecting into an interior portion of the gas cell and being in contact with said sponge.

2. The lubricant dispenser according to claim 1, wherein the components of the plastic injection-molded part have connection regions that engage into one another with a positive lock.

3. The lubricant dispenser according to claim 2, wherein said connection regions are rigidly connected with one another both by means of the positive lock and by means of chemical cross-linking of the plastics.

4. Lubricant dispenser according to claim 1, further comprising at least one gas exit opening on a circumferential portion of the insert.

5. The lubricant dispenser according to claim 1, wherein said lid is connected with the insert with a positive lock or with a material bond.

6. The lubricant dispenser according to claim 1, wherein said lid is domed concave to an outside portion of the insert.

7. The lubricant dispenser according to claim 1, wherein said outer ring has a face-side opening, said switch comprises a rotary switch disposed in said face-side opening, and said connection is disposed on said switch.

8. The lubricant dispenser according to claim 7, wherein the electrical connection comprises a conductor track having a resistance that is dependent on an angle of rotation of the switch, said conductor track being disposed on an inside portion of the switch.

9. The lubricant dispenser according to claim 7, further comprising a snap connection for holding the rotary switch in the outer ring of the cap so as to move in rotation with the cap.

10. The lubricant dispenser according to claim 1, wherein the current flow for gas generation lies in the range between 5 and 400 µA and wherein the conductive walls are made up of a plastic that has sufficient electrical conductivity by means of fillers.

11. The lubricant dispenser according to claim 10, wherein the fillers comprise graphite.

12. The lubricant dispenser according to claim 1, wherein said at least one projection projecting into the interior portion of the gas cell is configured as a tip.

13. The lubricant dispenser according to claim 1, wherein said at least one projection projecting into the interior portion of the gas cell is configured as a blade.

* * * * *